(12) United States Patent
Feigel, Jr. et al.

(10) Patent No.: US 10,988,995 B2
(45) Date of Patent: Apr. 27, 2021

(54) SHUTOFF VALVE

(71) Applicant: Universe Machine Corporation, Edmonton (CA)

(72) Inventors: Kurt R. Feigel, Jr., Edmonton (CA); Marcin K. Barker, Edmonton (CA)

(73) Assignee: Universe Machine Corporation, Edmonton (CA)

( * ) Notice: Subject to any disclaimer, the term of this patent is extended or adjusted under 35 U.S.C. 154(b) by 0 days.

(21) Appl. No.: 16/008,405

(22) Filed: Jun. 14, 2018

(65) Prior Publication Data
US 2019/0063627 A1 Feb. 28, 2019

Related U.S. Application Data

(63) Continuation of application No. 13/783,050, filed on Mar. 1, 2013, now abandoned.

(51) Int. Cl.
  E21B 19/16 (2006.01)
  F16K 11/07 (2006.01)
  F15B 13/04 (2006.01)
  F16K 17/00 (2006.01)
  F15B 20/00 (2006.01)

(52) U.S. Cl.
  CPC .......... *E21B 19/164* (2013.01); *E21B 19/165* (2013.01); *F16K 11/07* (2013.01); *F15B 13/0402* (2013.01); *F15B 20/00* (2013.01); *F16K 17/00* (2013.01); *Y10T 137/87249* (2015.04)

(58) Field of Classification Search
  None
  See application file for complete search history.

(56) References Cited

U.S. PATENT DOCUMENTS

| | | | |
|---|---|---|---|
| 1,775,856 | A | 9/1930 | Hauser |
| 2,831,466 | A | 4/1958 | Stueland |
| 3,797,967 | A | 3/1974 | Howeth |
| 4,215,602 | A | 8/1980 | Carstensen |
| 4,371,069 | A | 2/1983 | Lovegrove |
| 4,644,657 | A | 2/1987 | Von Der Heide |
| 5,535,645 | A | 7/1996 | Penisson |
| 5,740,702 | A | 4/1998 | Smith |
| 6,439,316 | B1 | 8/2002 | Penisson |

(Continued)

FOREIGN PATENT DOCUMENTS

| | | | |
|---|---|---|---|
| CA | 2705468 | | 12/2011 |
| CN | 102080509 A | * | 6/2011 |
| JP | 5614605 | | 2/1981 |

OTHER PUBLICATIONS

CN 102080509 A machine translation to English from espacenet. 2011. (Year: 2011).*

(Continued)

*Primary Examiner* — Michael Leslie
*Assistant Examiner* — Michael Quandt
(74) *Attorney, Agent, or Firm* — Lambert Intellectual Property Law

(57) ABSTRACT

A safety interlock valve with two flow passages, which in one position allows flow through the flow passages and blocks flow between them, and in another position blocks flow through the flow passages and allows flow between them. The safety interlock valve can be used in hydraulic systems such as power tongs.

8 Claims, 3 Drawing Sheets

(56) References Cited

U.S. PATENT DOCUMENTS 8,109,179 B2    2/2012   Richardson
8,418,586 B2    4/2013   Feigel, Jr. et al.
8,875,365 B2   11/2014   Huseman et al.

OTHER PUBLICATIONS

Modtek Manufacturing Corporation: Basic Door Jammer Hydraulic Door Lockout System; Owners Manual; Sep. 12, 2006; Edmonton, AB, Canada; p. 1-11.

\* cited by examiner

SHUTOFF VALVE

TECHNICAL FIELD

Shutoff valves for hydraulic systems.

BACKGROUND

Universe Machine Corporation has for many years supplied power tongs into the Canadian and United States oil field market place. The power tongs have a throat for receiving an oilfield tubular. A ring gear driven by motors engages the oilfield tubular. A hydraulic system supplies hydraulic power fluid to motors that drive the ring gears. To prevent the oilfield tubular exiting the throat of the power tong during use, the throat has a gate or door. Cable or hydraulic mechanisms have been used to shut off the hydraulic supply to the motors when the gate or door is opened. Cable mechanisms sold by Universe Machine Corporation have used a two piece valve shut off.

SUMMARY

There is provided a power tong with a cable operated door jammer valve for shutting off the hydraulic supply of a power tong when the door is opened. In an embodiment, there is provided a power tong comprising a ring gear and cage assembly having a throat, the ring gear and cage assembly being driven by a motor having a hydraulic supply, a door mounted on a pivot on the ring gear and cage assembly for movement to open and close the throat, a cable secured to the door at a point that is offset from the pivot, the cable extending through a sleeve to a valve end of the cable, a valve at the valve end of the cable, the valve having a valve housing and being operable by movement of a valve control to disengage the hydraulic supply from the motor, the valve end of the cable being connected to the valve control and the sleeve being connected to the valve housing.

There is provided a shutoff valve having a valve housing, a first fluid port in the valve housing, a second fluid port in the valve housing, a third fluid port in the valve housing, a fourth fluid port in the valve housing, and the valve being movable between first and second configurations, the first configuration allowing fluid flow between the first fluid port and the second fluid port and between the third fluid port and the fourth fluid port, the first configuration not allowing fluid flow between the first fluid port and the fourth fluid port, and the second configuration blocking flow between the first fluid port and the second fluid port and between the third fluid port and the fourth fluid port, the second fluid configuration allowing fluid flow between the first fluid port and the fourth fluid port.

In an embodiment, the valve may comprise a valve housing having a bore for receiving a valve spool, a valve spool movable between a first position and a second position within the bore, a first fluid port in the valve housing connected to the bore by a first flow passage within the valve housing and a second fluid port in the valve housing connected to the bore by a second flow passage within the valve housing, the valve spool being configured to allow fluid flow between the first flow passage and the second flow passage when the valve spool is in the first position, and the valve spool being configured to block fluid flow between the first flow passage and the second flow passage when the valve spool is in the second position, a third fluid port in the valve housing connected to the bore by a third flow passage within the valve housing and a fourth fluid port in the valve housing connected to the bore by a fourth flow passage within the valve housing, the valve spool being configured to allow fluid flow between the third flow passage and the fourth flow passage when the valve spool is in the first position, and the valve spool being configured to block fluid flow between the third flow passage and the fourth flow passage when the valve spool is in the second position, and the first fluid port being connected to the bore by a fifth flow passage within the valve housing, and the fourth fluid port being connected to the bore by a sixth flow passage within the valve housing. the valve spool being configured to block fluid flow between the fifth flow passage and the sixth flow passage when the valve spool is in the first position, and the valve spool being configured to allow fluid flow between the fifth flow passage and the sixth flow passage when the valve spool is in the second position.

In further embodiments the valve may have one or more of the following features: the shutoff valve may be substantially axially symmetric, the valve spool having thinner portions that allow fluid flow in the portions of the bore through which the thinner portions pass and having thicker portions that block fluid flow in the portions of the bore through which the thicker portions pass; the valve may be mounted in a hydraulic system with a hydraulic fluid source having an output line and a return line, and a hydraulic device having a input line and a drain line, in which the first fluid port is connected to the output line of the hydraulic fluid source, the second fluid port is connected to the input line of the hydraulic device, the third fluid port is connected to the drain line of the hydraulic device, and the fourth fluid port is connected to the return line of the hydraulic fluid source; the valve may be mounted in a hydraulic system with a hydraulic fluid source having an output line and a return line, and a hydraulic device having a input line and a drain line, in which the first fluid port is connected to the input line of the hydraulic device, the second fluid port is connected to the output line of the hydraulic fluid source, the third fluid port is connected to the return line of the hydraulic fluid source, and the fourth fluid port is connected to the drain line of the hydraulic device; the shutoff valve may be mounted in a hydraulic system with a hydraulic fluid source having an output line and a return line, and a hydraulic device having a input line and a drain line, in which the first fluid port is connected to the return line of the hydraulic fluid source, the second fluid port is connected to the drain line of the hydraulic device, the third fluid port is connected to the input line of the hydraulic device, and the fourth fluid port is connected to the output line of the hydraulic fluid source; the valve may be mounted in a hydraulic system with a hydraulic fluid source having an output line and a return line, and a hydraulic device having a input line and a drain line, in which the first fluid port is connected to the drain line of the hydraulic device, the second fluid port is connected to the return line of the hydraulic fluid source, the third fluid port is connected to output line of the hydraulic fluid source, and the fourth fluid port is connected to the input line of the hydraulic device; the valve may be connected to a detector for moving the valve spool to the second position on detecting the presence of a condition, and further the detector may move the valve spool to the first position on detecting that the condition is not present; the valve may be mounted in a hydraulic system comprising power tongs; the valve may be mounted in a hydraulic system comprising a motor operating power tongs, the power tongs having a throat and a door to prevent an oilfield tubular from exiting the throat, and the valve connected to a detector for moving the valve spool to the second position on detecting the presence of the condition that the door is open, and further the detector may be a cable connected to the door.

These and other aspects of the device are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 1:
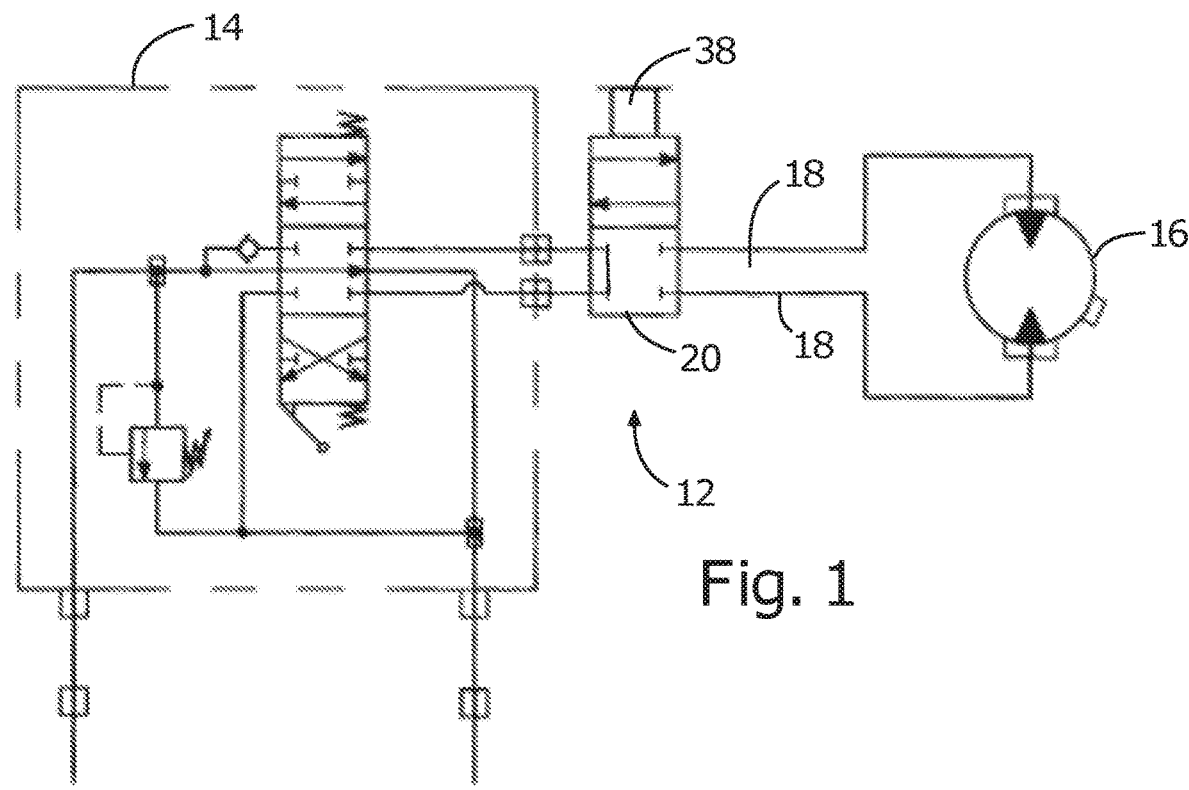
FIG. 1 shows a hydraulic circuit for a power tong.
Figure 2:
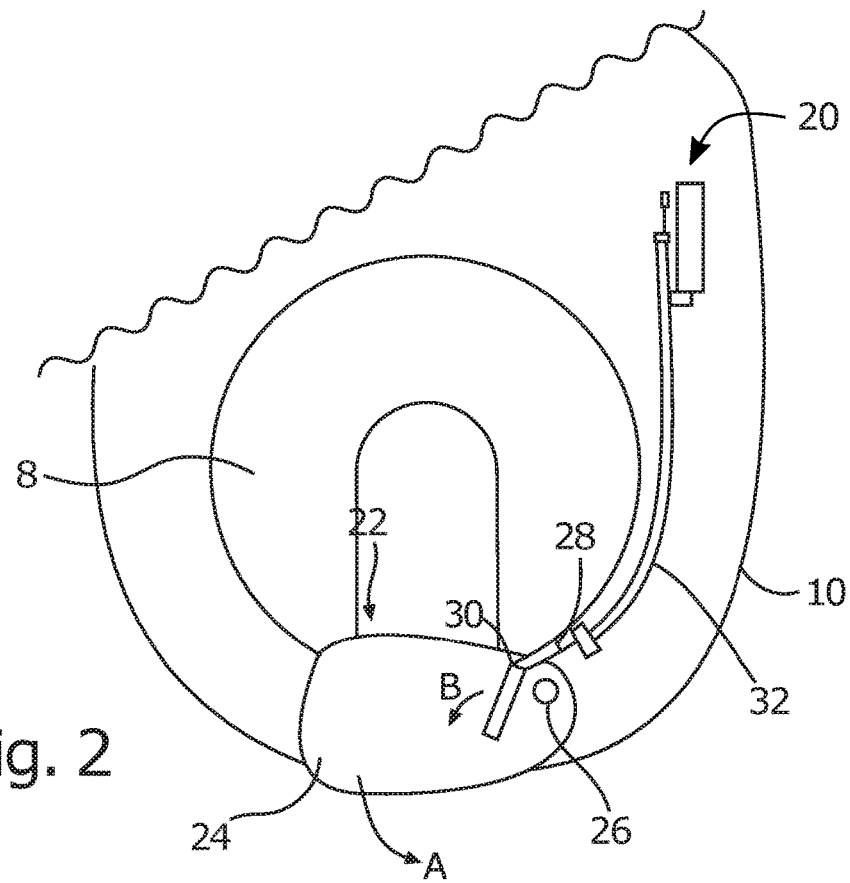
FIG. 2 shows a ring gear and cage assembly of a power tong.
Figure 3:
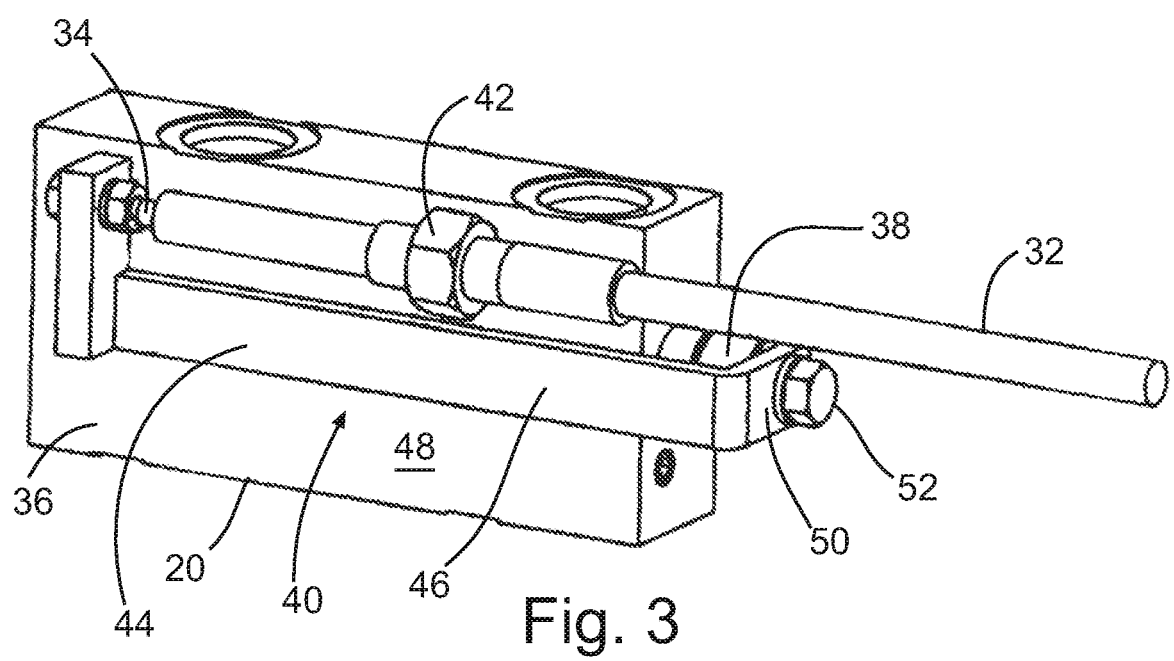
FIG. 3 shows a cable operated door jammer valve for use with the ring gear and cage assembly of FIG. 2.
Figure 4A:
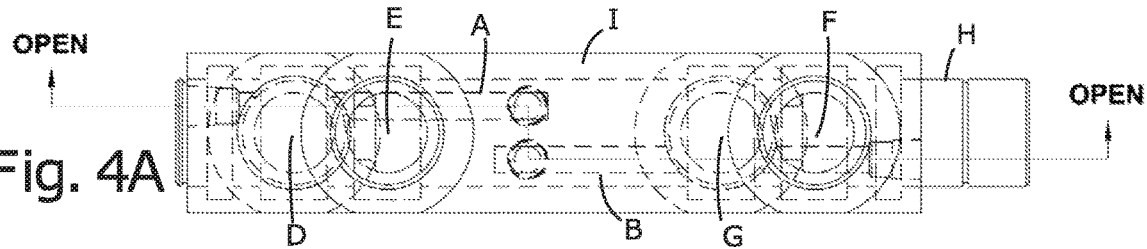
FIG. 4A shows a shutoff valve in an open position, from a viewpoint aligned with the inputs and outputs to the valve.
Figure 4B:
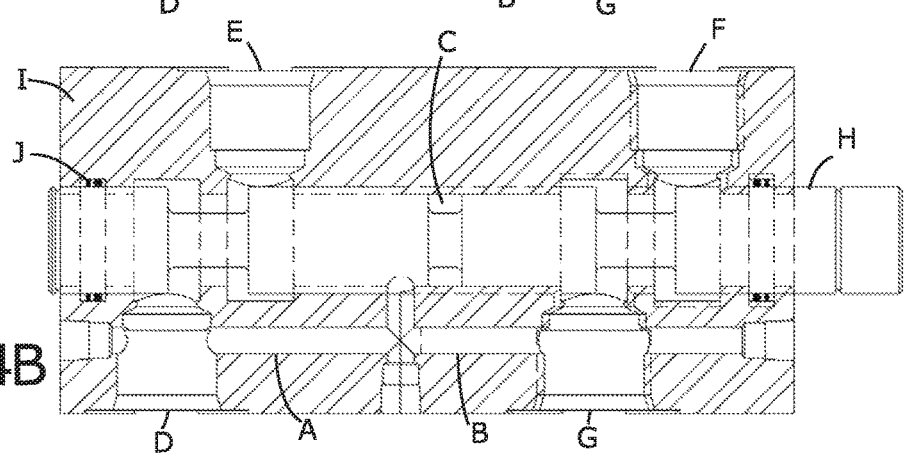
FIG. 4B shows the shutoff valve of FIG. 4A in an open position, from a viewpoint perpendicular to the inputs and outputs to the valve.
Figure 5A:
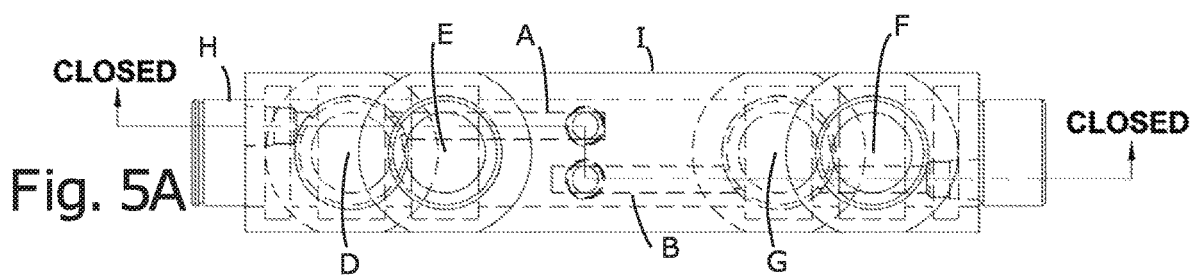
FIG. 5A shows the shutoff valve of FIG. 4A in a closed position, from a viewpoint aligned with the inputs and outputs to the valve.
Figure 5B:
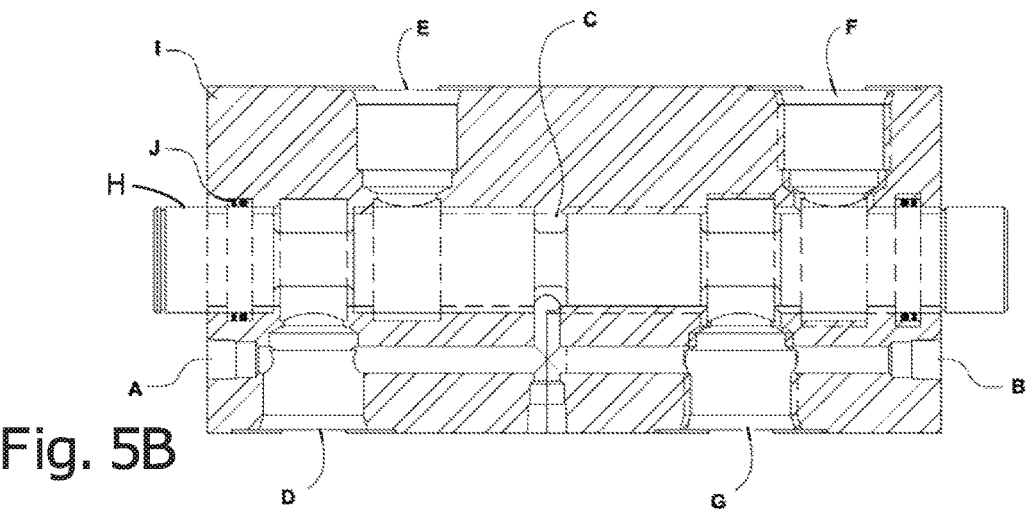
FIG. 5B shows the shutoff valve of FIG. 4A in a closed position, from a viewpoint perpendicular to the inputs and outputs to the valve.

Referring to FIGS. 1 and 2, a power tong 10 comprises a conventional ring gear and cage assembly 8 (FIG. 2) and hydraulic power circuit 12 (FIG. 1). The hydraulic power circuit 12 comprises a hydraulic supply 14 that supplies hydraulic fluid to motor 16 through lines 18. A shut off valve 20 is provided on the lines 18. The ring gear and cage assembly 8 has a throat 22 and the ring gear and cage assembly 8 is driven by the motor 16. The cooperation of the ring gear and cage assembly with the motor is known in the art and need not be described further here.

A door 24 is mounted on a pivot 26 on the ring gear and cage assembly 8 for movement to open and close the throat 22. A cable 28 is secured to the door 24 at a connection point 30 that is offset from the pivot 26. The cable 28 extends through a sleeve 32 to a valve end 34 of the cable 28. The sleeve 32 may be secured at various points along the power tong body 10.

The valve 20 is located on the power tong body 10 away from the throat 22 at the rear of the ring gear and cage assembly 8 and adjacent the hydraulic supply 14. The valve 20 is at the valve end 34 of the cable 28 and has a valve housing 36. The valve 20 is operable by movement of a valve control 38 to disengage the hydraulic supply 14 from the motor 16. The valve 20 is a conventional shut off valve in one embodiment, and may be a diverter valve in another embodiment. The valve end 34 of the cable 28 is connected to the valve control 38 via a rigid linkage 40. The sleeve 32 is connected and secured to the valve housing 36 by any of suitable means such as by welding nut 42 to the housing 36 of the valve 20.

The linkage 40 through which the cable 28 is connected to the valve control 38 may comprise in one embodiment a drive rod 44 having a main section 46 lying parallel to a wall 48 of the valve housing 36 and having an extension 50 extending laterally to the main section 46 to a connection point 52 with the valve control 38.

When the door 24 is opened in the direction of arrow A to open the throat 22, the connection point 30 rotates around the pivot 26 as shown by arrow B, thus pulling on the cable 28. The cable 28 moves through fixed sleeve 28 and pulls on the linkage 40, which pulls on the valve control 38 to operate the valve 20 and shut off hydraulic fluid supply to the motor 16.

FIGS. 4A-5B show an embodiment of the shutoff (safety interlock) valve. The valve spool H moves between two positions within a valve housing I, an open position shown in FIGS. 4A-4B that allows fluid to flow between port D and port E and between port F and port G, and a closed position shown in FIGS. 5A-5B that blocks fluid flow into or out of port E and into or out of port F but allows fluid flow between port D and port G. How it works is when the spool is closed the groove C connects ports D & G through the cross drilled holes A & B. As previously described, in the context of hydraulic power tongs the shutoff valve should generally be installed such that when door 24 is open the valve spool H is in the closed position and when door 24 is closed the valve spool H is in the open position. The valve can be installed in multiple configurations. In a typical configuration, when the valve is open oil from hydraulic supply 14 enters through port D and exits through port E to drive motor 16. Return oil from motor 16 enters through port F and exits through port G. In this configuration, when the shutoff valve is closed, but the hydraulic supply 14 is continuing to supply fluid, inflow into port D is allowed to flow through A and B back to G thus reducing the pressure on the spool and O-rings J. It also will greatly reduce the oil from leaking across the spool from port D to E and back through F to G which further increased the effectiveness of the safety interlock valve. In another configuration, the valve is connected so that oil from supply 14 flows into port E and out through port D to motor 16, and returns from motor 16 through ports G and F. In this configuration if oil pressure is applied to port E, any leakage across the spool to port D will go through the cross drilled holes A & B thus eliminating any differential pressure across the ports D and G thus making it impossible to cause any device attached to ports D and G to operate. This allows any oil that leaks past the spool to not pass through the motor thus further reducing the chance of the motor starting to creep rotate. The Safety interlock valve can also be connected in reverse so that oil pressure is applied via ports F and G and return flow is through ports D and E.

In the embodiment shown the valve spool H is axially symmetric for ease of construction. The valve spool has thicker portions that block flow through the portions of the bore through which the thicker portions pass, and thinner portions such as groove C that allow flow through the portions of the bore through which the thinner portions pass. The portions of the bore through which the thicker portions of the valve spool pass and the portions of the bore through which the thinner portions of the valve spool pass depend on the position of the valve spool.

The internal valve system of the safety interlock valve can provide the control valve spool seal plate damage protection. When the primary valve (motor spool) is activated and the door lock system is engaged, the internal ¼" ports soften any pressure surges in the primary valve section lessening the deformation of valve spool seal plates and likelihood of extrusion of the primary valve spools seals. This system is designed to mitigate pressure spikes when an operator pulls the wrong lever or bumps the lever when the door lock is activated. This internal hydraulic bypass can also ensure that any leakage from the primary valve (motor control valve) would not advance into the motor through the internal leakage of the door safety valve, thus negating the possibility of motor creep as well as extending motor seal life and seal plate extrusion (specifically the internally case drained RINEER™ motor).

In a further embodiment (not shown) the spool could have an additional groove, and additional cross drilled holes connected to port E and port F respectively could be connected through the additional groove when the valve spool is in the closed position. This further embodiment would both allow any incoming fluid to flow directly to the return line, and allow equalization of pressure of any leaked oil, at the expense of increased complexity.

The safety interlock valve can be used in conjunction with a detector for detecting a condition under which continued flow may be unsafe to shut off the flow of fluid in the event of detecting the condition. Depending on the embodiment, the detector may be configured to also operate the valve to re-enable flow in the event that the condition is not present, or may be configured, for example using a latch or other mechanism, to keep the valve in the closed position until manually reset.

In the context of hydraulic tongs the shut off valve may also be mounted so that it will stop the flow of oil from the valve which actually controls the power tong rotation. However if the tong has a multiple valve bank the other valves are not affected by this shutoff.

The embodiments of the invention in which an exclusive property or privilege is claimed are defined as follows:

1. A hydraulic system with a hydraulic fluid source and a hydraulic device comprising power tongs, the hydraulic system including a shutoff valve, the shutoff valve comprising:
    a valve housing having a bore for receiving a valve spool;
    the valve spool movable between an open position and a closed position within the bore, the valve spool being moved to the closed position based on operation of a valve control;
    the valve housing comprising a first fluid port, a second fluid port, a third fluid port, and a fourth fluid port, in which the first fluid port is connected to an output line of the hydraulic fluid source, the second fluid port is connected to an input line of the hydraulic device, the third fluid port is connected to a drain line of the hydraulic device, and the fourth fluid port is connected to a return line of the hydraulic fluid source;
    an internal hydraulic bypass comprising:
    a groove in the valve spool;
    a fifth flow passage within a wall of the valve housing connecting between the first fluid port and the groove when the valve spool is in the closed position;
    a sixth flow passage within the wall of the valve housing connecting between the fourth fluid port and the groove when the valve spool is in the closed position;
    in which the valve spool and valve housing define a third flow passage between the first fluid port and the second fluid port and a fourth flow passage between the third fluid port and the fourth fluid port when the valve spool is in the open position, and the valve spool is configured to block fluid flow between the first fluid port and the second fluid port and between the third fluid port and the fourth fluid port when the valve spool is in the closed position; and
    the valve spool being configured to block fluid flow between the valve spool and the bore on either side of the groove.

2. The hydraulic system of claim 1 in which the valve spool is substantially axially symmetric, the valve spool having thinner portions that allow fluid flow in the portions of the bore through which the thinner portions pass and having thicker portions that block fluid flow in the portions of the bore through which the thicker portions pass.

3. The hydraulic system of claim 1 in which the shutoff valve is operable by pulling on a cable connected to the valve control by a linkage, moving the valve spool from the open position to the closed position.

4. The hydraulic system of claim 3 in which the power tongs are motor operated power tongs, the power tongs having a throat and a door to prevent an oilfield tubular from exiting the throat, the door being connected to the cable and configured to pull on the cable when the door is not closed.

5. The hydraulic system of claim 1 in which the shutoff valve is operable by a cable connected to the valve control by a linkage, moving the valve spool from the open position to the closed position.

6. The hydraulic system of claim 1 in which the power tongs have a throat and a door to prevent an oilfield tubular from exiting the throat and the shutoff valve is operable by a cable connected to the door and connected to the valve control by a linkage, moving the valve spool from the open position to the closed position.

7. The hydraulic system of claim 6 in which the door is configured to pull on the cable when the door is not closed.

8. The hydraulic system of claim 6 in which the valve spool is in the open position when the door is closed.

* * * * *